United States Patent
Iwata et al.

(10) Patent No.: US 9,380,232 B2
(45) Date of Patent: Jun. 28, 2016

(54) IMAGE SENSORS WITH ANTI-ECLIPSE CIRCUITRY

(71) Applicant: Semiconductor Components Industries, LLC, Phoenix, AZ (US)

(72) Inventors: Shusuke Iwata, Tokyo (JP); Isao Takayanagi, Tokyo (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 79 days.

(21) Appl. No.: 14/185,614

(22) Filed: Feb. 20, 2014

(65) Prior Publication Data

US 2015/0237275 A1  Aug. 20, 2015

(51) Int. Cl.
| | |
|---|---|
| H04N 5/359 | (2011.01) |
| H04N 5/217 | (2011.01) |
| H04N 5/378 | (2011.01) |
| H04N 5/374 | (2011.01) |
| H04N 5/225 | (2006.01) |

(52) U.S. Cl.
CPC ........... H04N 5/3598 (2013.01); H04N 5/2175 (2013.01); H04N 5/2257 (2013.01); H04N 5/374 (2013.01); H04N 5/378 (2013.01)

(58) Field of Classification Search
CPC ... H04N 5/378; H04N 5/2175; H04N 5/2257; H04N 5/3598; H04N 5/374
USPC .................. 348/294, 302, 308, 241, 246, 248
See application file for complete search history.

(56) References Cited

U.S. PATENT DOCUMENTS

| | | | |
|---|---|---|---|
| 7,573,519 B2 | 8/2009 | Phan et al. | |
| 7,872,682 B2 | 1/2011 | Rysinski et al. | |
| 8,537,257 B2 | 9/2013 | Rysinski et al. | |
| 8,547,462 B2 | 10/2013 | Olsen | |
| 2012/0249851 A1* | 10/2012 | Martinussen | H04N 5/378 348/308 |
| 2014/0009654 A1 | 1/2014 | Rysinski et al. | |
| 2014/0320716 A1* | 10/2014 | Huang | 348/302 |

* cited by examiner

*Primary Examiner* — Lin Ye
*Assistant Examiner* — Chriss Yoder, III
(74) *Attorney, Agent, or Firm* — Treyz Law Group, P.C.; Jason Tsai; Andrew C. Milhollin

(57) ABSTRACT

An image sensor may include an array of image pixels arranged in rows and columns. Image pixels arranged along the same column may be coupled to a column line. The column line may be coupled to anti-eclipse control circuitry. In one suitable arrangement, the anti-eclipse control circuitry may include a data converter and an eclipse condition judgment circuit. The eclipse condition judgment circuit may be configured to record pixel output values at different points in time and to compare the recorded data to a predetermined threshold to determine whether an eclipse condition is satisfied. In another suitable arrangement, the anti-eclipse control circuitry may include a comparator and an eclipse condition judgment circuit. The comparator may compare a temporarily elevated pixel output value to a reference voltage to determine whether the eclipse condition is satisfied. In either arrangement, a maximum pixel level may be output when the eclipse condition is met.

12 Claims, 8 Drawing Sheets

IMAGE SENSORS WITH ANTI-ECLIPSE CIRCUITRY

BACKGROUND

This relates generally to imaging systems and, more particularly, to imaging systems having circuitry for handling the eclipse phenomenon.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Column circuitry is coupled to each pixel column for reading out pixel signals from the image pixels. The column circuitry often implements a correlated double sampling (CDS) procedure, which involves obtaining pixel signals by computing the difference between reset signals sampled during reset operations and image signals sampled following charge transfer operations.

As is well known in the art, the eclipse phenomenon occurs when at least some pixels are exposed to strong light such as direct illumination from the sun. The strong light may cause electrons to spill over from the photodiode into the floating diffusion region, which results in an erroneous reset signal to be sampled (i.e., reset signals sampled during reset operations may exhibit voltage levels that are less than the desired reset level). Consequently, the pixel signal computed via CDS becomes an undesirably small value, the effect of which is manifested when an over-illuminated pixel appears dark when it should be bright.

It would therefore be desirable to provide improved imaging systems with circuitry for compensating errors caused by the eclipse phenomenon.

DETAILED DESCRIPTION

Figure 1:
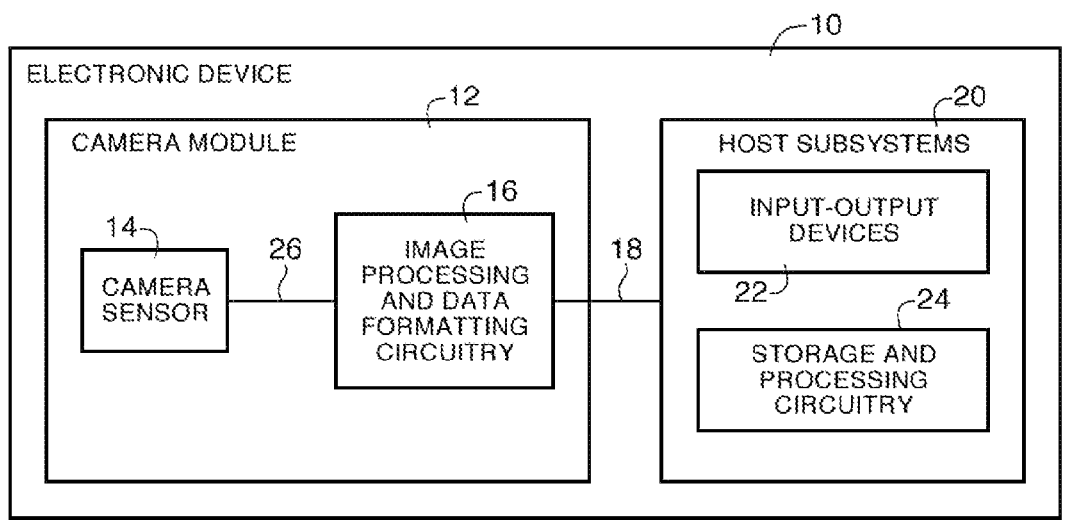
FIG. 1 is a diagram of an illustrative electronic device that may include an imager that includes anti-eclipse circuitry in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
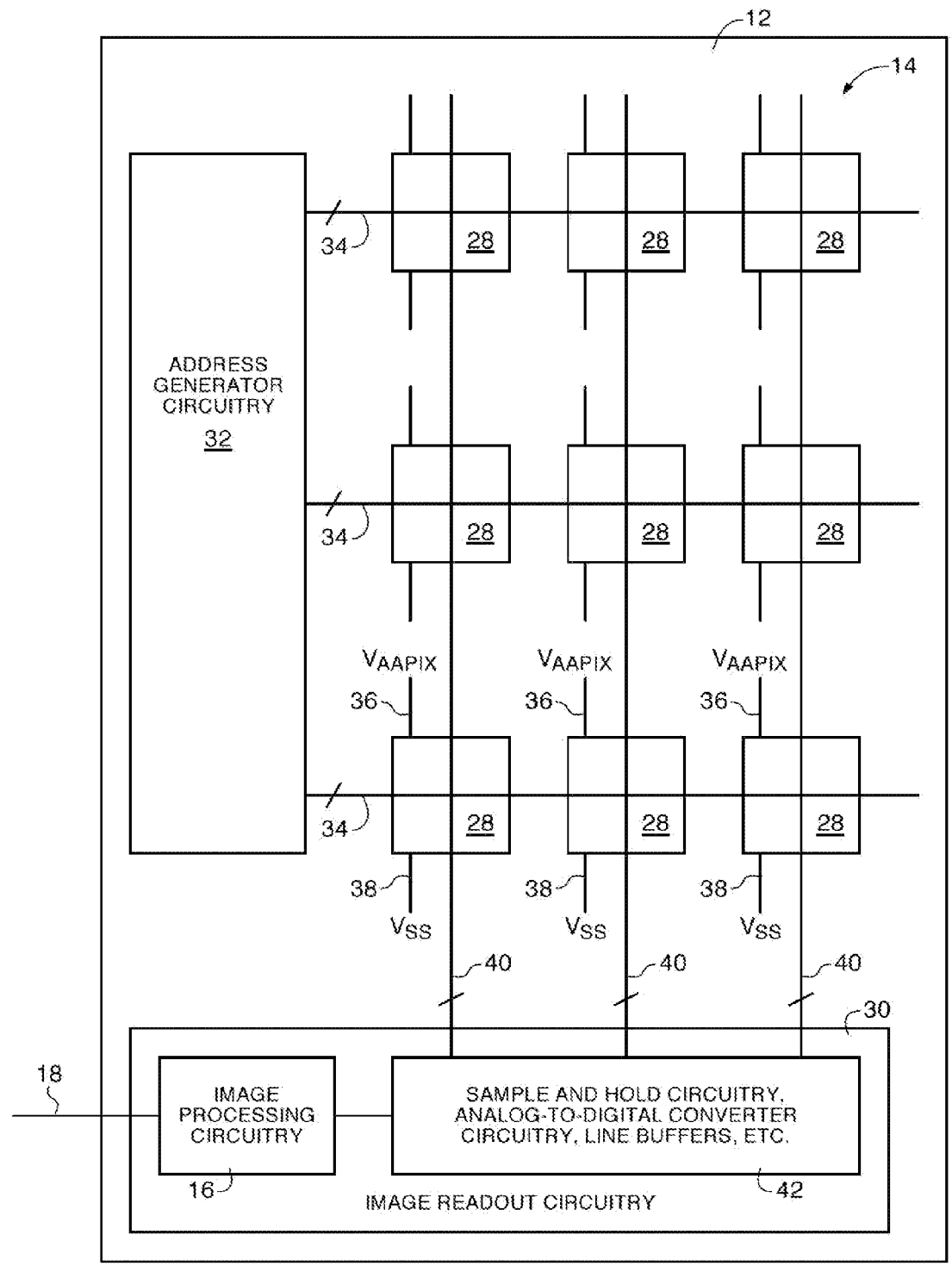
FIG. 2 is a diagram of an illustrative array of image pixels and control circuitry coupled to the array of image pixels in accordance with an embodiment of the present invention.

An example of an arrangement for image sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
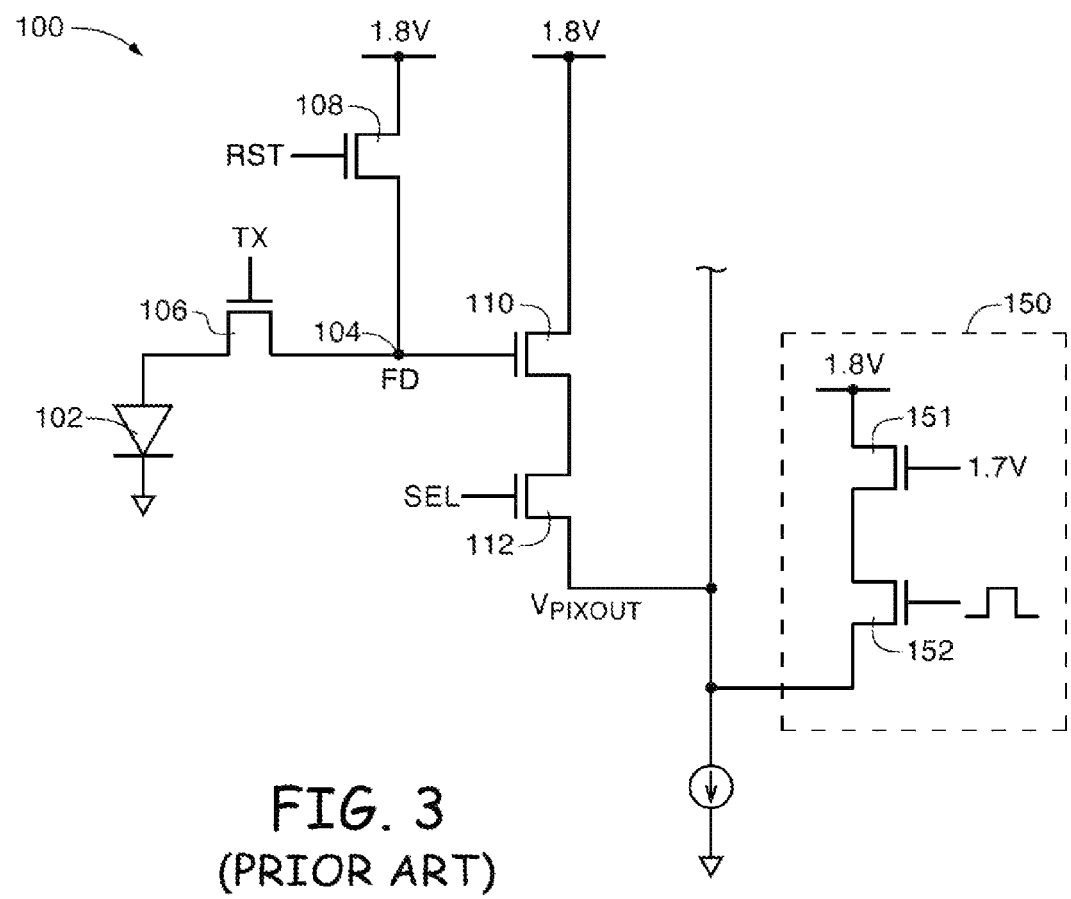
FIG. 3 is a circuit diagram of an image pixel that is coupled to a conventional anti-eclipse circuit.

FIG. 3 shows a diagram of an image pixel 100 that is coupled to a conventional anti-eclipse circuit 150. Pixel 100 includes a photodiode 102, a charge transfer gate 106, a floating diffusion node 104, a reset transistor 108, a source follower transistor 110, and a row select transistor 112. Photodiode 102 is coupled to floating diffusion node 104 via charge transfer transistor 106. Control signal TX can be driven high to allow charge accumulated in photodiode 102 to be transferred to node 104. Reset transistor 108 is connected between a 1.8 V power supply terminal and floating diffusion node 104 and is turned on by driving reset signal RST high to drive node 104 to the 1.8 V reset level. Source follower transistor 110 and row select transistor 112 are coupled in series between the 1.8 V power supply terminal and a column output line. In particular, transistor 110 has a gate that is connected to node 104, whereas transistor 112 has a gate that is controlled by row select signal SEL.

Signal SEL can be driven high to so that signals can be read out from pixel 100 onto the column output line. Voltage Vpixout on the column output line may represent the pixel signal at any given point in time during readout operations. As shown in FIG. 3, circuit 150 is connected to the column output line. In particular, circuit 150 includes transistors 151 and 152 connected in series between to the 1.8 V power supply terminal and the column output line. Transistor 151 has a gate terminal that receives a 1.7 V power supply voltage, whereas transistor 152 has a gate terminal that receives a control pulse. The purpose of circuit 150 may be described in connection with the timing diagram of FIG. 4.

Figure 4:
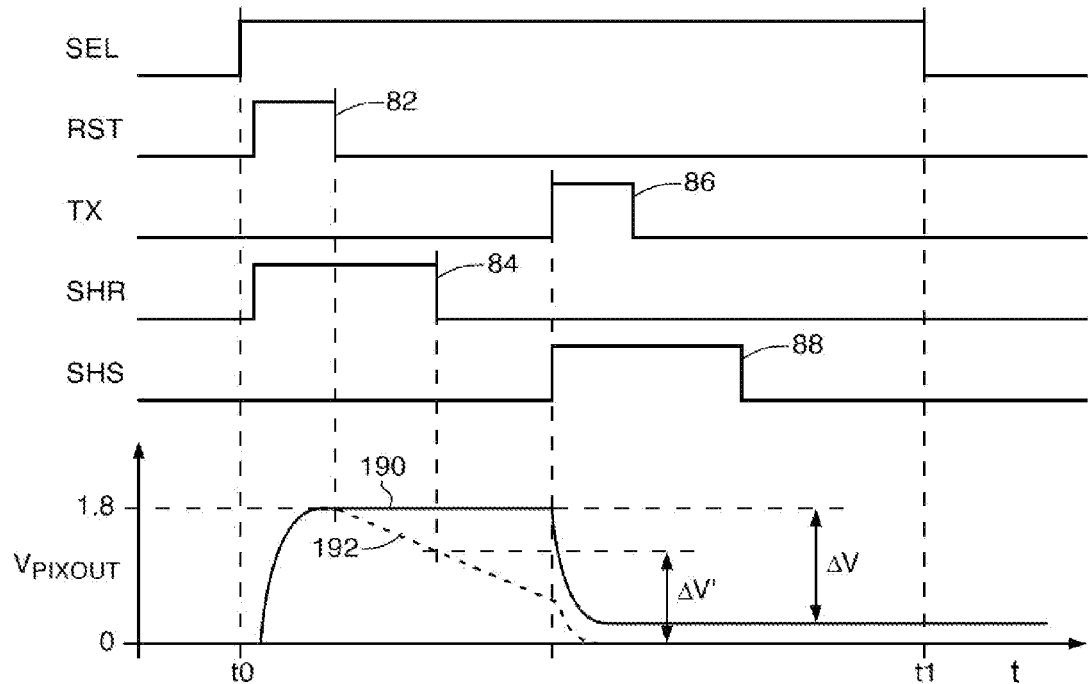
FIG. 4 is a timing diagram illustrating the eclipse phenomenon.

FIG. 4 shows control signals that may be used in controlling image pixel 100 of FIG. 3. In the example of FIG. 4, pixel 100 is read out using a correlated double sample (CDS) scheme. At time t0, signal SEL is driven high to initiate a readout operation. In this type of arrangement, a reset pulse 82 activates reset transistor 108, which resets the voltage on floating diffusion node 104. Because the reset voltage of node 104 can vary slightly, it is generally desirable to sample the reset voltage on nodes 104 so that the reset voltage can be subtracted from image signals at a later time. Sample and hold control signals (SHR) 84 may be asserted to sample and hold the reset voltage on node 104. A TX pulse 86 subsequently activates transfer transistor 106, which transfers image charges accumulated by photodiode 102 in response to incident light from photodiode 102 to floating diffusion node 104. Sample and hold control signals (SHS) 88 may be asserted to sample and hold the transferred charges in node 104. Associated image processing circuitry may then subtract the reset voltage from the accumulated charges to obtain the final pixel output. Signal SEL is then driven low at the end of the readout operation (at time t1).

FIG. 4 also shows the voltage waveform of Vpixout on the column output line. Curve 190 shows the behavior of Vpixout during normal lighting conditions, whereas curve 192 shows the behavior of Vpixout during strong lighting conditions. The RST pulse 82 causes signal Vpixout to be driven high to 1.8 V. During normal lighting conditions, curve 190 remains high (as it should) and may begin to decrease when the TX signal is pulsed. The resulting CDS output may be computed as value $\Delta V$.

During strong lighting conditions, the strong light generates excessive charge in the photodiode, which may cause electrons to spill into the floating diffusion node. This spillage may result in Vpixout to fall, as shown by the behavior of line 192. This results in the sampled reset signal to be substantially lower than the desired 1.8 V. The final CDS output may be computed as value $\Delta V'$. As shown in this example, $\Delta V'$ computed for the strong light scenario is substantially less than $\Delta V$ computed for the normal light scenario. This is erroneous as the output associated with the strong light level should be at least greater than the output associated with the normal lighting level. This undesirable effect is sometimes referred to as the eclipse phenomenon, where the center of a very bright object can appear dark while the outer edge appears bright.

In an effort to mitigate the eclipse phenomenon, circuits have been developed to counteract the inadvertent reduction of Vpixout during reset operations. Referring back to FIG. 3, circuit 150 represents one such type of conventional anti-eclipse circuit. Transistor 152 is turned on only during reset operations (i.e., when signal SHR is high). Controlled in this way, transistor 152 will be activated when Vpixout falls below 1.7 V when pixel 100 is over-illuminated. When Vpixout falls below 1.7 V (sometimes referred to as the "reset clip level"), transistor 152 conducts current and charges Vpixout up towards 1.7 V (i.e., transistor 152 charges the column output line up to at least one threshold voltage level below 1.7 V).

Figure 5:
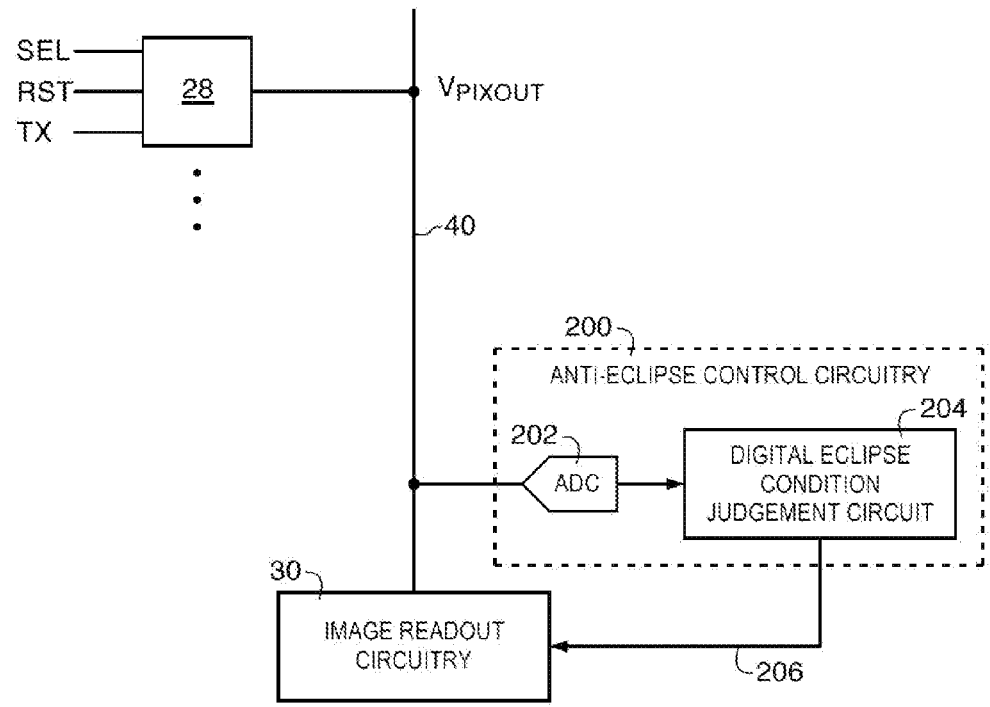
FIG. 5 is a diagram of image pixels coupled to analog anti-eclipse circuitry in accordance with an embodiment of the present invention.

In one suitable arrangement of the present invention, a fully digital anti-eclipse control circuitry is provided (see, e.g., FIG. 5). As shown in FIG. 5, at least one image pixel 28 may be coupled to a corresponding column line 40. Pixel 28 may be controlled by at least a row-select signal SEL, a reset signal RST, a charge transfer signal TX, and other suitable row control signals. In general, tens or hundreds of image sensor pixels 28 arranged along the same column in image pixel array 14 (FIG. 2) may be coupled to column line 40. As described in connection with FIG. 2, column line 40 may be coupled to image readout circuitry 30, which can include amplifier circuits, sample and hold circuits, data converting circuits, and other image processing circuitry. Image readout circuitry 30 may be configured to implement the correlated double sampling (CDS) scheme in which the difference between a sample and held reset level and a sample and held image signal is computed to obtain the final digital pixel output signal.

In accordance with an embodiment, column line 40 may also be coupled to anti-eclipse circuitry such as digital anti-eclipse control circuitry 200 that can be used to mitigate the eclipse phenomenon. Anti-eclipse control circuitry 200 may include an analog-to-digital converter (ADC) 202 and a digital eclipse conditional judgment circuit 204. Analog-to-digital converter 202 may serve to convert analog signal Vpixout to a corresponding digital signal. Judgment circuit 204 may receive the digital signal from data converter 202 and can be used to determine whether the selected pixel 28 is currently being exposed to strong light. The term "strong light" as used herein may refer to bright lighting conditions that should result in the maximum pixel output level (e.g., a saturated pixel output level). Other lighting conditions that should result in pixel output levels less than the saturated amount may be referred to as "normal lighting."

For example, digital eclipse condition judgment circuit 204 may be used to monitor Vpixout and may generate control signals on path 206 that direct image readout circuitry 30 to output a computed CDS value in response to detecting normal lighting conditions and that direct image readout circuitry 30 to output a maximum pixel output level regardless of the computed CDS value in response to detecting strong light.

Figure 6:
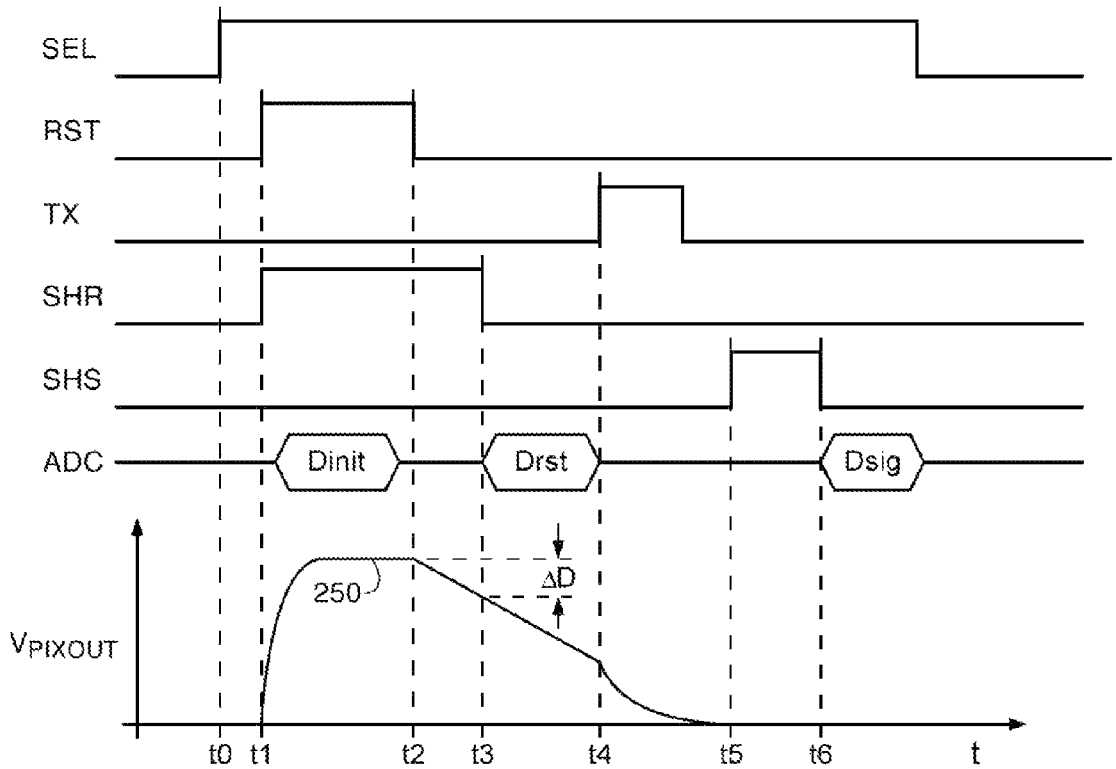
FIG. 6 is a timing diagram illustrating the operation of circuitry of the type shown in FIG. 5 in accordance with an embodiment of the present invention.

FIG. 6 is a timing diagram that illustrates the operation of the digital eclipse condition judgment circuit 204 of FIG. 5 when a selected pixel 28 suffers from the eclipse phenomenon. At time t0, row-select signal SEL may be asserted to select a given row of image sensor pixels for readout. At time t1, reset signal RST may be pulsed high to drive Vpixout to a reset signal voltage level (see, waveform 250). While signal RST is asserted, ADC 202 may generate a corresponding digital output Dinit, which is temporarily stored in judgment circuit 204. Value Dinit may therefore correspond to the desired 1.8V level.

At time t2, reset signal RST may be deasserted. At this point, the strong light may cause the selected pixel 28 to generate an excessive amount of charge, which can spill into the floating diffusion node of pixel 28 and cause Vpixout to decrease at some variable rate. At time t3 (e.g., at the falling edge of sample and hold reset control signals SHR), the digital output generated at ADC 202 may be temporarily stored in judgment circuit 204 as Drst. As shown in FIG. 6, the amount of voltage drop in Vpixout corresponds to ΔD, which is equal to the difference between Dinit and Drst. Difference ΔD may be computed using judgment circuit 204. At this point, judgment circuit 204 determines whether pixel 28 is over-exposed (i.e., whether pixel 28 is exposed to strong light). For example, judgment circuit 204 may compare ΔD to a predetermined threshold amount to determine whether the eclipse condition is satisfied. A large ΔD may result in a positive determination of the eclipse condition, whereas a relative small ΔD may result in a negative determination of the eclipse condition.

At time t4, charge transfer signal TX may be pulsed high to transfer any accumulated charge at the photodiode to the floating diffusion region. This should cause Vpixout to fall even further. At time t5 (e.g., at the falling edge of sample and hold signal control signals SHS), the digital output generated at ADC 202 may be temporarily stored in judgment circuit 204 as Dsig. A corresponding CDS value may then be computed by calculating the difference between Drst and Dsig. The CDS value may be replaced by the maximum output level if the digital eclipse condition judgment circuit 204 determines that the selected image pixel suffers from the eclipse condition. Configured in this way, anti-eclipse control circuitry 200 serves double duty as implementing both correlated double sampling and eclipse phenomenon detection and correction. Control circuitry 200 may be considered to be part of image readout circuitry 30. If desired, additional data converting circuitry need not be included in image readout circuitry 30 to reduce cost.

Figure 7:
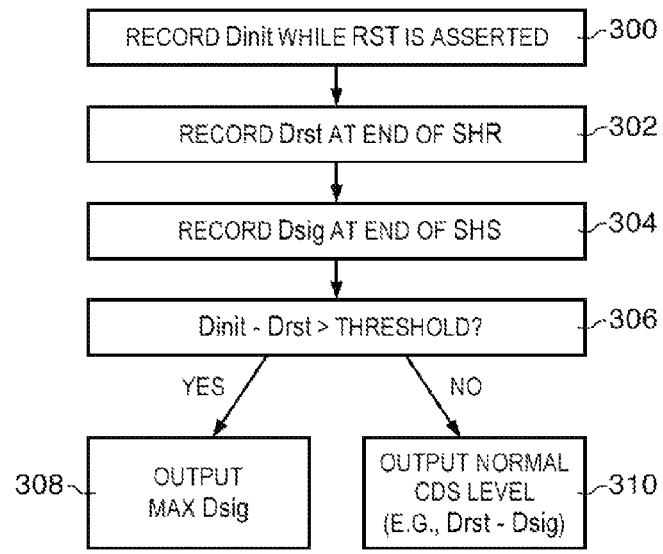
FIG. 7 is a flow chart of illustrative steps for operating the circuitry of FIG. 5 in accordance with an embodiment of the present invention.

FIG. 7 shows illustrative steps involved in operating circuitry 200 of the type described in connection with FIG. 5. At step 300, circuitry 200 may record Dinit while signal RST is asserted. At step 302, circuitry 200 may record Drst at the end of the sample and hold reset (SHR) operation. At step 304, circuitry 200 may record Dsig at the end of the sample and hold signal (SHS) operation.

At step 306, circuitry 200 may compute the difference between Dinit and Drst and compare that different to a predetermined eclipse condition threshold. If the computed difference is less than the predetermined threshold (step 310), the eclipse condition is not met and image readout circuitry 30 should be directed to output the CDS level (e.g., to output Drst minus Dsig). If the computed difference is greater than the predetermined threshold (step 308), the eclipse condition is satisfied and image readout circuitry 30 should be directed to output the maximum saturated pixel signal (the CDS value need not be computed or can be discarded).

Figure 8:
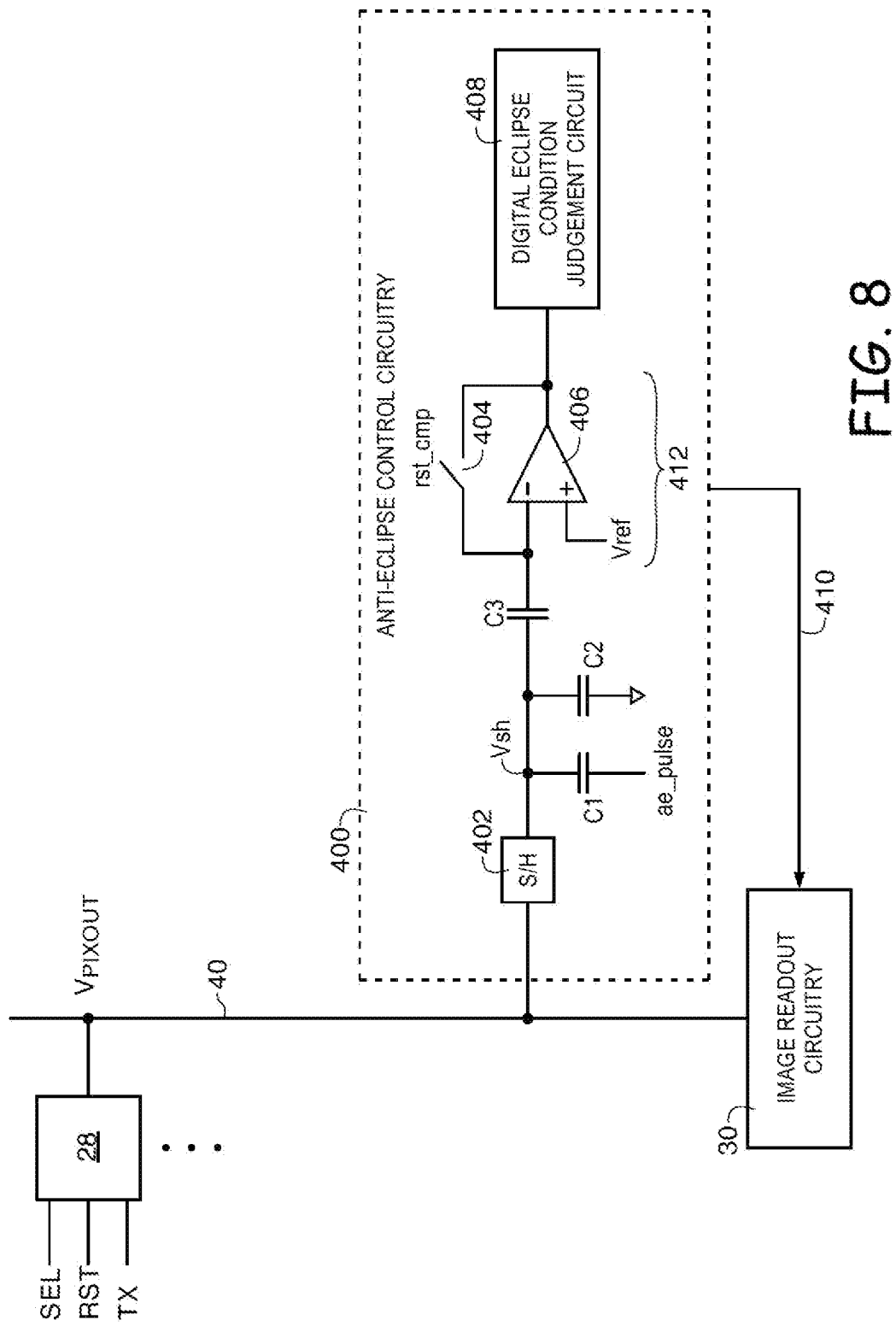
FIG. 8 is a diagram of image pixels coupled to hybrid anti-eclipse circuitry in accordance with an embodiment of the present invention.

In another suitable arrangement of the present invention, column line 40 may be coupled to hybrid analog/digital anti-eclipse circuitry such as anti-eclipse control circuitry 400 that can be used to mitigate the eclipse phenomenon (see, e.g., FIG. 8). As shown in FIG. 8, anti-eclipse control circuitry 400 may include a sample and hold (S/H) circuit 402, capacitors C1, C2, and C3, a one-bit analog-to-digital converter 412, and a digital eclipse condition judgment circuit 408. Circuit 402 may sample voltage Vpixout on column line 40 and output a held voltage signal Vsh. Capacitor C1 may have a first terminal that is coupled to the output of S/H circuit 402 and a second terminal that receives an anti-eclipse control signal ae_pulse. Capacitor C2 may have a first terminal that is coupled to the output of S/H circuit 402 and a second terminal that is coupled to a ground power supply line. Capacitor C3 may have a first terminal that is coupled to the output of S/H circuit 402 and a second terminal that is coupled to converter 412.

Converter 412 may be implemented using an analog comparator 406 having a first (+) input that receives a reference voltage signal Vref, a second (−) input that is coupled to the second terminal of capacitor C3, and an output. A switch 404 may be coupled between the second input and the output of comparator 406 and may serve as a reset switch for comparator 406 (e.g., signal rst_cmp may be asserted to perform reset operations for comparator 406). Connected in this way, comparator 406 may serve to output either a logic "1" when the analog signal at its second input is less than Vref or a logic "0" when the analog signal at its second input is greater than Vref. Circuits 402, capacitors C1-C3, and comparator 406 are therefore sometimes considered collectively as the analog portion of circuitry 400.

Judgment circuit 408 may receive the digital signal from data converter 412 and can be used to determine whether the selected pixel 28 is currently being exposed to strong light or normal light. For example, digital eclipse condition judgment circuit 408 may be used to monitor Vpixout and may generate control signals on path 410 that direct image readout circuitry 30 to output a computed CDS value in response to detecting normal lighting conditions and that direct image readout circuitry 30 to output a maximum pixel output level regardless of the computed CDS value in response to detecting over-illumination.

Figure 9:
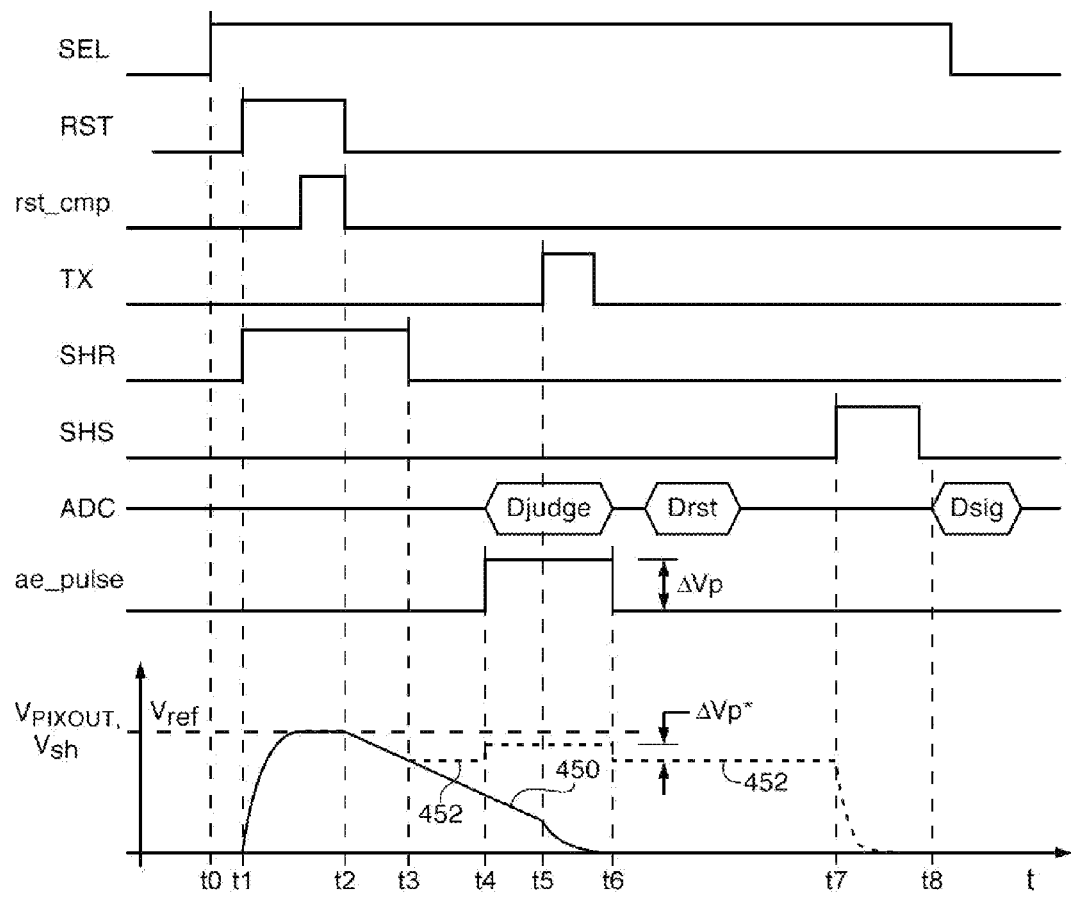
FIG. 9 is a timing diagram illustrating the operation of circuitry of the type shown in FIG. 8 in accordance with an embodiment of the present invention.

FIG. 9 is a timing diagram that illustrates the operation of the hybrid anti-eclipse control circuitry 400 of FIG. 8 when a selected pixel 28 is subject to strong light. At time t0, row-select signal SEL may be asserted to select a given row of image sensor pixels for readout. At time t1, reset signal RST may be pulsed high to drive Vpixout to a reset signal voltage level (see, Vpixout waveform 450). Waveform 452 may correspond to the voltage level of signal Vsh at the input of comparator 406. When S/H circuit 402 is activated, signal Vsh generally tracks Vpixout (e.g., waveform 452 generally follows waveform 450 during sample and hold operations). In this particular example, the reset voltage level is equal to reference voltage level Vref.

At time t2, reset signal RST may be deasserted. Signal rst_cmp may be pulsed high towards the end of the RST pulse to properly reset comparator 406. At this point, strong light may cause the selected pixel 28 to generate an excessive amount of charge, which can spill into the floating diffusion node of pixel 28 and cause Vpixout to decrease at some variable rate.

At time t3 (e.g., at the falling edge of sample and hold reset control signals SHR), the present voltage level at Vpixout will held at the output of circuit 402. In other words, the Vsh waveform 452 should stay constant after t3 while the Vpixout waveform 450 can continue to fall.

At time t4, anti-eclipse control signal may be temporarily pulsed high be a predetermined amount $\Delta Vp$. Amount $\Delta Vp$ may be equal or may be different than Vref depending on the values of capacitance C1, C2, and C3. Temporarily raising ae_pulse may cause Vsh to rise by a corresponding amount $\Delta Vp^*$. In general, amount $\Delta Vp$ should be selected so that the temporarily raised voltage level of Vsh is greater than Vref during normal lighting conditions and so that Vsh is less than Vref during eclipse conditions. Ae_pulse may be necessary when the sampled Vsh is still less than Vref during normal light conditions. If the sampled Vsh is nominally greater than the selected Vref level during all non-eclipse conditions, ae_pulse need not be used to temporarily elevate Vsh.

While ae_pulse is asserted, the digital output generated by comparator 406 may be temporarily stored in digital judgment circuit 408 as Djudge. A high Djudge value may correspond to normal lighting conditions, whereas a low Djudge value may correspond to strong lighting conditions. At time t5, charge transfer signal TX may be pulsed high to transfer any accumulated image signal at the photodiode to the floating diffusion region. This should cause Vpixout to fall even further.

At time t6, ae_pulse is deasserted, which causes waveform 452 to fall back to its sampled level. At this point in time, image readout circuitry 30 may use additional data converting circuitry and to record signal Drst corresponding to the held level of Vsh.

At time t7, circuit 402 may again be activated to sample and hold the image signal presented on column line 40. Because Vsh tracks Vpixout, the Vsh waveform 452 may fall at time t7. At time t8 (e.g., at the falling edge of sample and hold signal control signals SHS), the additional data converting circuitry in image readout circuitry 30 may be used to record signal Dsig corresponding to the current held level of Vsh. A corresponding CDS value may then be computed by calculating the difference between Drst and Dsig. The CDS value may be replaced by the maximum output level if the digital eclipse condition judgment circuit 408 determines that the selected image pixel suffers from the eclipse condition. Control circuitry 400 may sometimes be considered to be part of image readout circuitry 30. In general, the additional data converter in circuitry 30 may have higher resolution than data converter 412 in control circuitry 400.

Figure 10:
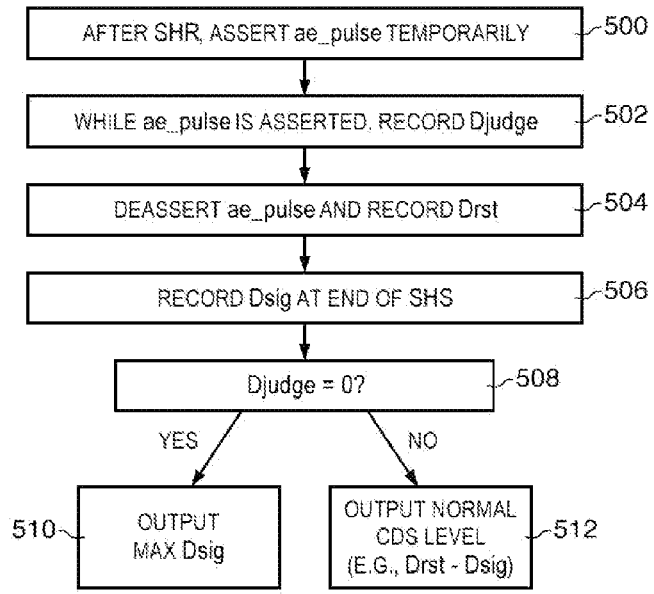
FIG. 10 is a flow chart of illustrative steps for operating the circuitry of FIG. 8 in accordance with an embodiment of the present invention.

FIG. 10 shows illustrative steps involved in operating circuitry 400 of the type described in connection with FIG. 8. At step 500, circuitry 400 may assert ae_pulse after SHR operations. At step 502, judgment circuit 408 may record Djudge while ae_pulse is asserted. At step 504, ae_pulse may be deasserted and image readout circuitry 30 may be used to record a reset signal Drst. At step 506, image readout circuitry 30 may be used to record an image signal Dsig.

At step 508, digital eclipse condition judgment circuit 408 may determine whether the eclipse condition is met by analyzing the value of Djudge. If Djudge is equal to a logic "1" value (step 512), the eclipse condition is not met and image readout circuitry 30 should be directed to output the CDS level (e.g., to output Drst minus Dsig). If Djudge is equal to a logic "0" value (step 510), the eclipse condition is satisfied and image readout circuitry 30 should be directed to output the maximum saturated pixel signal (the CDS value need not be computed or can be discarded).

Figure 11:
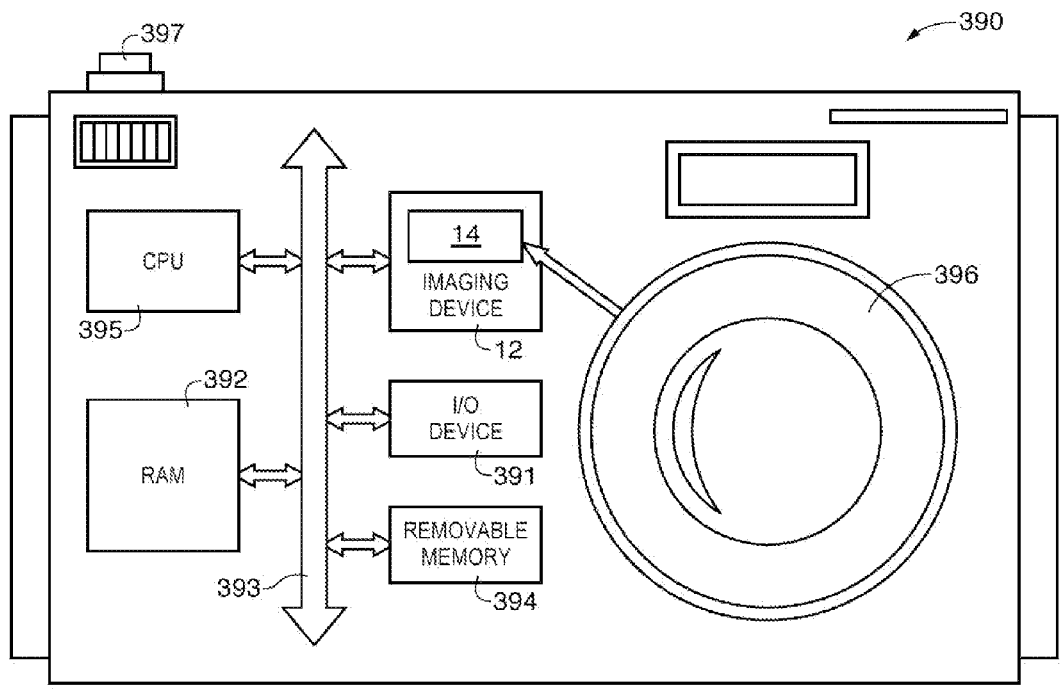
FIG. 11 is a block diagram of a system employing the embodiments of FIGS. 5-10 in accordance with an embodiment of the present invention.

FIG. 11 shows, in simplified form, a typical processor system 390. Processor system 390 is exemplary of a system having digital circuits that include imaging device 14 equipped with anti-eclipse control circuitry of the type described in connection with FIGS. 5-10. Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 390, which may be a digital still or video camera system, may include a lens such as lens 396 for focusing an image onto a pixel array such as pixel array 14 when shutter release button 397 is pressed. Processor system 390 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 16 may also communicate with CPU 395 over bus 393. System 390 may include random access memory (RAM) 392 and removable memory 394. Removable memory 394 may include flash memory that communicates with CPU 395 over bus 393. Imaging device 12 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating an electronic device (see, e.g., device 10 of FIG. 1) that includes an imaging system and host subsystems. An imaging system may include one or more image sensors. Each image sensor may include an array of image pixels formed on a semiconductor substrate. Each image pixel may include one or more photosensitive elements configured to convert incoming light into electric charges.

In particular, image pixels arranged along a column in the array may be coupled to a corresponding pixel column output line. The column output line may be coupled to anti-eclipse control circuitry that can be used to determine whether a selected pixel in that column is over-exposed (i.e., whether the selected pixel suffers from the eclipse condition).

In one suitable arrangement, the anti-eclipse control circuitry includes an analog-to-digital converter (ADC) and a digital eclipse condition judgment circuit. The ADC may serve to receive pixel signals from the selected pixel and to convert the received pixel signals into digital signals. The digital eclipse condition judgment circuit receives the digital signals from the ADC determines whether the selected pixel is over-illuminated by analyzing the received digital signals. For example, the judgment circuit may obtain first and second digital pixel measurements, compute a difference of the first and second digital pixel measurements, and compare the computed difference to a predetermined threshold to determine whether the selected pixel satisfies the eclipse condition. In response to determining that the eclipse condition is not satisfied, a correlated double sampling (CDS) pixel value may be outputted. In response to determining that the eclipse condition is satisfied, a saturated pixel value may be outputted instead of the computed CDS pixel value.

In another suitable arrangement, the anti-eclipse control circuitry includes a sample and hold circuit, a comparator, and a digital eclipse condition judgment circuit. The comparator may have a first input that receives a reference voltage signal, a second input that receives a sampled signal from the sample and hold circuit, and an output that is coupled to the digital eclipse condition judgment circuit. In particular, a control signal may be pulsed to temporarily raise the voltage level at the second input of the comparator. While the control signal is pulsed high, the comparator may generate a corresponding comparator output signal. If the comparator output signal is a first value, the digital eclipse condition judgment circuit may direct associated image processing circuitry to output a correlated double sampling (CDS) pixel value. If the comparator output signal is a second value, the digital eclipse condition judgment circuit may direct the image processing circuitry to output a maximum pixel value instead of the computed CDS pixel value.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An image sensor, comprising:
   a plurality of image sensor pixels;
   an output line that is coupled to a portion of the plurality of image sensor pixels; and
   anti-eclipse control circuitry that is coupled to the output line and that determines whether a selected pixel in the portion of the plurality of image sensor pixels is over-exposed, wherein the anti-eclipse control circuitry includes an eclipse condition judgment circuit that receives signals from the output line and that determines whether the selected pixel is over-exposed by monitoring the received signals, and wherein the eclipse condition judgment circuit obtains first and second digital pixel measurements, computes a difference of the first and second digital pixel measurements, and compares the computed difference to a predetermined threshold value to determine whether the selected pixel is over-exposed, and wherein the anti-eclipse control circuitry further includes an analog-to-digital converter interposed between the output line and the eclipse condition judgement circuit.

2. The image sensor defined in claim 1, wherein the anti-eclipse control circuitry further includes a comparator having a first input that receives a reference voltage signal, a second input, and an output that is coupled to the eclipse condition judgment circuit.

3. The image sensor defined in claim 2, wherein the anti-eclipse control circuitry further includes a sample and hold circuit interposed between the output line and the second input of the comparator.

4. The image sensor defined in claim 2, wherein the eclipse condition judgment circuit determines that the selected pixel is over-exposed when the comparator outputs a deasserted value.

5. A method of operating an image sensor, comprising:
   with a plurality of image sensor pixels, receiving incoming light;
   with a selected pixel in the plurality of image sensor pixels, outputting a signal on a corresponding output line; and
   with anti-eclipse control circuitry that is coupled to the output line, determining whether the selected pixel suffers from an eclipse condition by monitoring the output signal, wherein the anti-eclipse control circuitry includes a data converter having a comparator with a first input that receives a reference voltage signal and a second input, and wherein the anti-eclipse control circuitry includes a capacitor having a first terminal coupled to the second input of the comparator and having a second terminal that receives a control signal;
   pulsing the control signal to temporarily raise the voltage level at the second input of the comparator; and
   while the control signal is asserted, outputting a comparator output with the comparator.

6. The method defined in claim 5, wherein the anti-eclipse control circuitry includes a digital eclipse condition judgment circuit, the method further comprising:
   with the data converter, receiving the output signal from the output line and converting the output signal to a digital signal; and
   with the digital eclipse condition judgment circuit, receiving the digital signal from the data converter and determining whether the selected pixel suffers from the eclipse condition by analyzing the digital signal.

7. The method defined in claim 6, further comprising:
   with a sample and hold circuit, sampling the output signal; and
   with the second input of the comparator, receiving the sampled output signal from the sample and hold circuit.

8. The method defined in claim 5, further comprising:
   in response to determining that the comparator output is a first value, outputting a correlated double sampling (CDS) value; and
   in response to determining that the comparator output is a second value that is different than the first value, outputting a maximum pixel output value instead of the CDS value.

9. A system, comprising:
   a central processing unit;
   memory;
   a lens;
   input-output circuitry; and
   an imaging device, wherein the imaging device comprises:
      a pixel array having a plurality of image pixels arranged in rows and columns;
      a pixel column line that is coupled to a group image pixels arranged along a corresponding column in the pixel array;
      image readout circuitry coupled to the column line; and
      anti-eclipse control circuitry that is coupled to the pixel column line and that determines whether a selected pixel in the group of image pixels is over-illuminated, wherein the anti-eclipse control circuitry includes a comparator having a first input that receives a reference voltage and a second input that receives a signal from the pixel column line, and wherein the voltage at the second input of the comparator is temporarily raised during readout to determine whether the selected pixel is over-illuminated, and wherein the image readout circuitry and the anti-eclipse control circuitry are coupled to the column line in parallel.

10. The system defined in claim 9, wherein the anti-eclipse control circuitry further includes a digital eclipse condition judgment circuit that monitors a pixel signal output from the selected pixel to determine whether the selected pixel is over-illuminated.

11. The system defined in claim 9, wherein the image readout circuitry computes a correlated double sampling (CDS) pixel output value.

12. The system defined in claim 11, wherein the digital eclipse condition judgment circuit directs the image readout circuitry to output the CDS pixel output value when the selected pixel is not over-illuminated and directs the image readout circuitry to output a saturated pixel output value when the selected pixel is over-illuminated.

* * * * *